US012509092B2

(12) United States Patent
Jeon (10) Patent No.: US 12,509,092 B2
(45) Date of Patent: Dec. 30, 2025

(54) INTERLOCK CONTROL SYSTEM LINKED TO DIGITAL KEY AND INTERLOCK CONTROL METHOD FOR THE SAME

(71) Applicants: HYUNDAI MOTOR COMPANY, Seoul (KR); Kia Corporation, Seoul (KR)

(72) Inventor: Seul Ki Jeon, Hwaseong-si (KR)

(73) Assignees: HYUNDAI MOTOR COMPANY, Seoul (KR); Kia Corporation, Seoul (KR)

( * ) Notice: Subject to any disclaimer, the term of this patent is extended or adjusted under 35 U.S.C. 154(b) by 794 days.

(21) Appl. No.: 17/527,587

(22) Filed: Nov. 16, 2021

(65) Prior Publication Data

US 2022/0355801 A1   Nov. 10, 2022

(30) Foreign Application Priority Data

May 10, 2021   (KR) .................. 10-2021-0060239

(51) Int. Cl.
*B60W 40/08*      (2012.01)
*B60K 28/06*      (2006.01)
(Continued)

(52) U.S. Cl.
CPC ........... *B60W 40/08* (2013.01); *B60K 28/063* (2013.01); *B60W 50/0097* (2013.01);
(Continued)

(58) Field of Classification Search
CPC ........ B60W 40/08; B60W 2040/0836; B60W 2040/0872; B60W 50/0097; B60W 50/12;
(Continued)

(56) References Cited

U.S. PATENT DOCUMENTS 4,697,666 A * 10/1987 Collier ................. B60K 28/063
340/576
2005/0230175 A1 * 10/2005 Brown ................. B60K 28/063
340/426.22
(Continued)

FOREIGN PATENT DOCUMENTS

EP   1957973   *  3/2016   ............ B60W 50/12
EP   1957973 B1 *  3/2016   ............ B60K 28/06
(Continued)

OTHER PUBLICATIONS

EP-1957973 Translation from Espacenet (Year: 2016).*
(Continued)

*Primary Examiner* — Joan T Goodbody
(74) *Attorney, Agent, or Firm* — MORGAN, LEWIS & BOCKIUS LLP (57) ABSTRACT

An interlock control system linked to a digital key includes an alcohol interlock controller, which calculates a decomposition time period required to decompose blood alcohol of each driver using personal information of the driver, extracted by authenticating a digital key, when a blood alcohol concentration measured by an alcohol measuring sensor exceeds a reference value. The alcohol interlock controller then restricts ignition of a vehicle using the digital key for the decomposition time period. By calculating and providing the decomposition time period for restricting the ignition of the vehicle, based on the personal information and an actual alcohol clearance of the driver, predicted information on a time point for allowing the driver to drive the vehicle is provided to the driver. An interlock control method for the same is also provided.

16 Claims, 4 Drawing Sheets

(51) Int. Cl.
  *B60W 50/00* (2006.01)
  *G07C 9/00* (2020.01)
(52) U.S. Cl.
  CPC . *G07C 9/00563* (2013.01); *B60W 2040/0836* (2013.01); *B60W 2040/0872* (2013.01); *G07C 2009/00769* (2013.01)
(58) Field of Classification Search
  CPC .......... B60W 10/06; B60W 2040/0881; G07C 9/00563; G07C 2009/00769; G07C 9/00309; G07C 9/00571; B60K 28/063; B60N 2/0248; B60R 25/04; G01N 33/4972
  See application file for complete search history.

(56) References Cited

U.S. PATENT DOCUMENTS

| | | | | |
|---|---|---|---|---|
| 2010/0312431 | A1* | 12/2010 | Kaschner | B60K 28/063 701/1 |
| 2013/0285816 | A1* | 10/2013 | Sezanayev | G07C 9/00174 340/576 |
| 2022/0169152 | A1* | 6/2022 | Kim | B60N 2/0248 |

FOREIGN PATENT DOCUMENTS

| | | | | |
|---|---|---|---|---|
| JP | 2010221786 | * | 10/2010 | ............. B60K 28/06 |
| KR | 20040095477 | * | 11/2004 | ........... G01N 1/2813 |
| KR | 20050007917 | * | 1/2005 | ............. B60R 25/10 |
| KR | 20070061721 | * | 6/2007 | ........... B60N 2/0244 |
| KR | 20200117722 | * | 10/2020 | ........... B60K 28/063 |
| KR | 10-2022-0077707 A | | 6/2022 | |

OTHER PUBLICATIONS

JP-2010221786 from IP.com (Year: 2010).*
S. Jhunjhunwala, H. Gahlaut, H. R. Singh, R. Daman and K. Pandey, "Driver Soberness System for road vehicles," 2017 International Conference on Computer, Communications and Electronics (Comptelix), Jaipur, India, 2017, pp. 49-52. (Year: 2017).*
S. Das, "A Smart Solution with Ignition Interlock Device to Prevent Drunk-Driving Accidents," 2021 7th IEEE Intl Conference on Big Data Security on Cloud (BigDataSecurity), IEEE Intl Conference on High Performance and Smart Computing, (HPSC) and IEEE Intl Conference on Intelligent Data and Security (Year: 2021).*
JP_2010221786 translation (Year: 2010).*
KR20040095477 translation (Year: 2004).*

* cited by examiner

INTERLOCK CONTROL SYSTEM LINKED TO DIGITAL KEY AND INTERLOCK CONTROL METHOD FOR THE SAME

CROSS-REFERENCE TO RELATED APPLICATION

This application claims the benefit of priority to Korean Patent Application No. 10-2021-0060239, filed in the Korean Intellectual Property Office on May 10, 2021, the entire contents of which are incorporated herein by reference.

TECHNICAL FIELD

The present disclosure relates to an interlock control system linked to a digital key, capable of restricting the ignition of a vehicle for an alcohol decomposition time period calculated by utilizing persona information, and an interlock control method for the same.

BACKGROUND

Recently, as the awareness of drunk drinking is increased, worldwide efforts have been made to regulate a vehicle such that the vehicle is equipped with an alcohol ignition interlock function of restricting the ignition of the vehicle when detecting alcohol, thereby prevent drunk drinking.

Accordingly, to realize the existing alcohol ignition interlock function, after detecting alcohol from exhalation of a driver through an alcohol measuring sensor provided in the vehicle, the ignition of the vehicle is restricted depending on the detection result.

However, when the ignition of the vehicle is restricted as described above, the driver may not determine a time period taken to turn on the ignition of the vehicle. Accordingly, the driver may indefinitely wait while repeatedly trying to turn on the ignition of the vehicle every arbitrary time, or may give up the use of the vehicle. Accordingly, the convenience in the use of the vehicle may be degraded.

In particular, a time period for decomposing alcohol is significantly varied depending on an individual constitution of a user, as well as on the weight and the gender of the user. Accordingly, an alcohol decomposition time period point allowing driving may not be exactly detected.

In general, both an electrochemical-type sensor employing a mouse piece to sense alcohol of the driver or an optical-type sensor having no mouse piece require at least one exhalation from the driver to the alcohol measuring sensor.

Accordingly, the driver has to inconveniently incline the body toward the alcohol measuring sensor, such that the air from the driver is put into the alcohol measuring sensor in a sitting status.

The information disclosed in the Background section above is to aid in the understanding of the background of the present disclosure, and should not be taken as acknowledgement that this information forms any part of prior art.

SUMMARY

The present disclosure has been made to solve the above-mentioned problems occurring in the prior art while advantages achieved by the prior art are maintained intact.

An aspect of the present disclosure provides an interlock control system linked to a digital key, which includes an alcohol interlock controller, which calculates a decomposition time period required to decompose blood alcohol of each driver using personal information of the driver, which is extracted by an IMS controller by authenticating a digital key when a blood alcohol concentration calculated by an alcohol measuring sensor exceeds a reference value, and then restricts the ignition of a vehicle using the digital key for the decomposition time period, thereby calculating the decomposition time period for restricting the ignition of the vehicle, based on the personal information and an actual alcohol clearance of the driver, and providing the decomposition time period, such that predicted information on a time point for allowing the driver to drive the vehicle is provided to the driver, and an interlock control method for the same.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an interlock control system linked with a digital key includes the digital key, which is authenticated in relation to use authority of a vehicle through wireless communication with the vehicle, an alcohol measuring sensor disposed in the vehicle to measure a blood alcohol concentration of the driver by receiving exhalation of the driver, and an alcohol interlock controller which calculates a first decomposition time period required to decompose blood alcohol of the driver using personal information of the driver, which is extracted by authenticating the digital key, when the blood alcohol concentration calculated by the alcohol measuring sensor exceeds a reference value, and restricts the ignition of the vehicle using the digital key for the first decomposition time period.

In addition, the alcohol interlock controller includes a decomposition time period calculator to calculate the first decomposition time period predicted as being required to decompose the blood alcohol, based on the personal information of the driver, when the blood alcohol concentration of the driver transmitted from the alcohol measuring sensor exceeds the reference value, and an integrated memory system (IMS) controller to restrict the ignition using the digital key for the first decomposition time period calculated by the decomposition time period calculator.

In addition, the decomposition time period calculator calculates the first decomposition time period by dividing the blood alcohol concentration by an alcohol clearance per hour.

In addition, the alcohol interlock controller may further include an alcohol clearance regulator to increase or decrease the alcohol clearance per hour of the driver, by considering a second decomposition time period, which is re-calculated based on the re-measured blood alcohol concentration, and a time period elapsed to a current time point from the first decomposition time period, which was previously calculated, when the same driver re-measures a blood alcohol concentration using the alcohol measuring sensor before the decomposition time period has elapsed.

In addition, the alcohol clearance regulator increases or decreases the alcohol clearance per hour individualized for a specific driver, depending on a result of the comparison between a remaining decomposition time period (h1−t1) obtained by subtracting the elapsed time period (t1) from the first decomposition time period (h1) calculated by the decomposition time period calculator at the initial stage, and the second decomposition time period (h2) which is re-calculated depending on the re-measured blood alcohol concentration.

In addition, the alcohol clearance regulator increases the alcohol clearance per hour to a specific ratio, when the second decomposition time period (h2) is less than the remaining decomposition time period (h1−t1).

In addition, the alcohol clearance regulator decreases the alcohol clearance per hour to a specific ratio, when the second decomposition time period (h2) is greater than the remaining decomposition time period (h1−t1).

In addition, the alcohol interlock controller further includes a decomposition time period elapse determining device to recognize whether the first decomposition time period is elapsed through a timer disposed in the vehicle, and to transmit a wording or a voice for notifying that the digital key is able to be re-authenticated to turn on the ignition and a blood alcohol concentration is able to be re-measured, to a cluster or a smart phone of the driver, after the first decomposition time period has elapsed.

In addition, the IMS controller may automatically adjust a driver seat, depending on the personal information of the driver, such that the mouth of the driver is placed at an alcohol measuring position at which the driver comfortably exhales to the alcohol measuring sensor, when the driver gets in the vehicle to measure a blood alcohol concentration of the driver.

In addition, the IMS controller turns on the ignition of the vehicle and automatically adjusts the driver seat to a preset driving position such that the driver turns on the ignition of the vehicle and comfortably drives, when a measurement result by the alcohol measuring sensor does not exceed the reference value corresponding to drunk driving.

In addition, according to another aspect of the present disclosure, the interlock control method linked to a digital key includes a digital key information receiving step of receiving a serial number of the digital key through wireless communication between the digital key and a vehicle and of authenticating the use authority for the vehicle, an alcohol measuring step of receiving exhalation of a driver, which is input into an alcohol measuring sensor, to measure a blood alcohol concentration, and an alcohol interlock controlling step of calculating a first decomposition time period required to decompose blood alcohol of each driver, based on the personal information of the driver, which is extracted by authenticating the digital key, when the blood alcohol concentration measured by the alcohol measuring sensor exceeds a preset reference value, and of restricting the ignition of the vehicle using the digital key for the first decomposition time period.

In addition, the alcohol interlock controlling step includes a decomposition time period calculating procedure of calculating a first decomposition time period predicted as being required to decompose the blood alcohol, based on the personal information of the driver, when the blood alcohol concentration of the driver transmitted from the alcohol measuring sensor exceeds the preset reference value, and an ignition restricting procedure of restricting the ignition using the digital key for the first decomposition time period calculated in the decomposition time period calculating procedure.

In addition, the decomposition time period calculating procedure includes calculating the first decomposition time period by dividing the blood alcohol concentration by an alcohol clearance per hour.

In addition, the alcohol interlock controlling step further includes an alcohol clearance regulating procedure of increasing or decreasing the alcohol clearance per hour of the driver, by considering a second decomposition time period re-calculated based on a blood alcohol concentration, which is re-measured, and a time period elapsed to a current time point from the first decomposition time period, which was previously calculated, when the same driver re-measures the blood alcohol concentration using the alcohol measuring sensor before the first decomposition time period.

In addition, in the alcohol clearance regulating procedure, an alcohol clearance per hour individualized for a specific driver is regulated depending on a result of the comparison between a remaining decomposition time period (h1−t1) obtained by subtracting the elapsed time period (t1) from the first decomposition time period (h1) calculated by the decomposition time period calculating procedure at the initial stage, and the second decomposition time period (h2) which is re-calculated depending on the re-measured blood alcohol concentration.

In addition, in the alcohol clearance regulating procedure, an alcohol clearance per hour is increased to a specific ratio, when the second decomposition time period (h2) is less than the remaining decomposition time period (h1−t1).

In addition, in the alcohol clearance regulating procedure, the alcohol clearance per hour is decreased to a specific ratio, when the second decomposition time period (h2) is greater than the remaining decomposition time period (h1−t1).

In addition, the alcohol interlock controlling step further includes a decomposition time period elapse determining procedure of recognizing whether the first decomposition time period has elapsed through a timer disposed in the vehicle, and transmitting a wording or a voice for notifying that the digital key is able to be re-authenticated to turn on the ignition and a blood alcohol concentration is able to be re-measured, to a cluster or a smart phone of the driver, after the first decomposition time period has elapsed.

In addition, according to the present disclosure, the method further include an alcohol measuring position controlling step of automatically adjusting a driver seat such that the driver is positioned at an alcohol measuring position at which the driver conveniently exhales to the alcohol measuring sensor, based on the personal information of the driver getting in the vehicle before the alcohol measuring step.

In addition, the method further includes a driving position controlling step of turning on the ignition of the vehicle and automatically adjusting the driver seat to a preset driving position such that the driver turns on the ignition of the vehicle and comfortably drives, when a measurement result by the alcohol measuring sensor does not exceed the reference value corresponding to drunk driving.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, exemplary embodiments of the present disclosure will be described in detail with reference to FIGS. 1 to 4.

Figure 1:
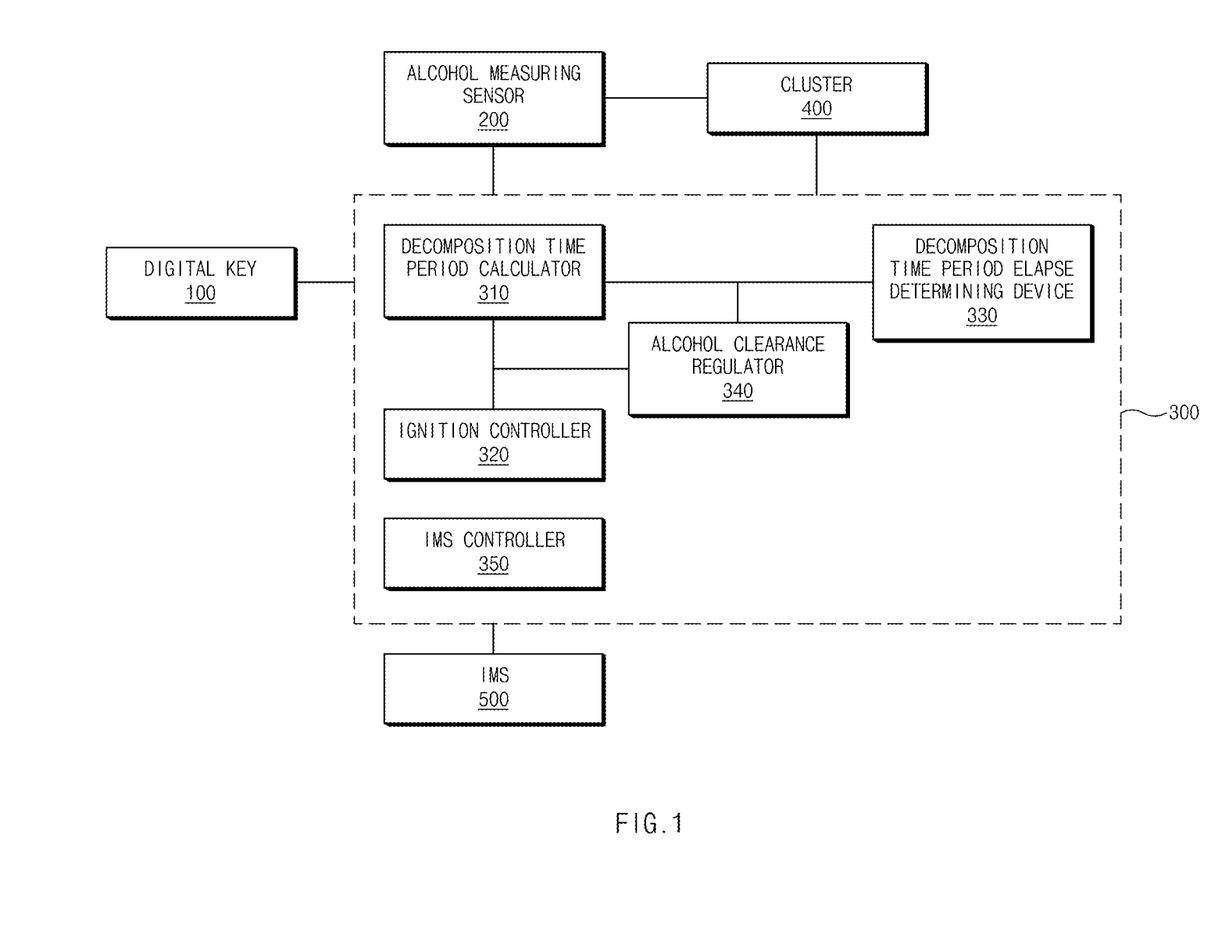
FIG. 1 is a block diagram of an interlock control system linked to a digital key, according to an exemplary embodiment of the present disclosure.

FIG. 1 is a block diagram of an interlock control system linked to a digital key, according to an exemplary embodiment of the present disclosure.

Referring to FIG. 1, according to the present disclosure, an interlock control system linked to a digital key may include a digital key 100, which is authenticated in relation to use authority of a vehicle through wireless communication with the vehicle, an alcohol measuring sensor 200 disposed in the vehicle to measure a blood alcohol concentration of the driver by receiving exhalation of the driver, and an alcohol interlock controller 300 which calculates a decomposition time period required to decompose blood alcohol of the driver using personal information of the driver, which is extracted by an integrated memory system (IMS) controller by authenticating the digital key 100 when the blood alcohol concentration measure by the alcohol measuring sensor 200 exceeds a reference value, and restricts the ignition of the vehicle using the digital key 100 for the decomposition time period.

The digital key 100, which is installed in the form of an application in a smart phone or a smart card, may be authenticated in relation to the use authority for controlling the vehicle to open a door or to turn on the ignition of the vehicle, through a device for short-range wireless communication such as near field communication (NFC).

Since the driver may be specified to be authenticated such that the driver controls the vehicle, by using the digital key 100 as described above, an IMS controller installed in the vehicle may extract personal information, such as the height, the weight, the gender, and the sitting height of the authenticated driver, from information stored in an IMS, by using information on the authenticated digital key 100. Accordingly, an individual customized service, such as a service of adjusting the position of a driver seat and the direction of a side mirror, may be provided based on the personal information of the driver, which is extracted by the IMS controller.

In addition, the digital key 100 enables not only the lock/unlock control of the door, ignition control, key management, and the remote control of the vehicle, but also the reception of vehicle information, such as a drivable distance in a current fuel status, or the air pressure of the vehicle, in the link to another unit, thereby enhancing the convenience in vehicle management.

In addition, the alcohol measuring sensor 200, which is a sensor to measure the blood alcohol concentration by receiving the exhalation from the driver, may include various types of sensors, such as an electrochemical-type sensor or an optical-type sensor.

Such an alcohol measuring sensor 200 may be mounted at an upper portion of a steering wheel, a front portion of a cluster, or on an overhead console, such that a driver on a driver seat conveniently measures the blood alcohol concentration of the driver.

In this case, a reference value for determining whether the blood alcohol concentration measured by the alcohol measuring sensor 200 corresponds to drunk driving may be set differently depending on a drunk driving punishment standard of each country.

In addition, the alcohol interlock controller 300 may include a decomposition time period calculator 310 to calculate a decomposition time period predicted as being required to decompose blood alcohol, based on the personal information of the driver, which is extracted by the IMS controller by authenticating the digital key 100, when the blood alcohol concentration of the driver, which is transmitted from the alcohol measuring sensor 200 exceeds a preset reference value, and an IMS controller 350 to restrict the ignition using the digital key 100 for the decomposition time period calculated by the decomposition time period calculator 310.

As described above, the alcohol interlock controller 300 calculates the decomposition time period required to decompose blood alcohol, based on the personal information of the driver, and restricts the ignition of the vehicle only for the decomposition time period, thereby preventing drunk driving. In addition, since the driver is able to recognize a time period to be elapsed to use the vehicle again, the convenience in the use of the vehicle may be enhanced.

In this case, the decomposition time period calculator 310 may calculate and provide the decomposition time period predicted as being required to decompose the blood alcohol of the driver, through a Widmark formula based on the blood alcohol concentration of the driver and the personal information of the driver.

The Road Traffic Authority of Korea expands the Widmark formula that calculates the blood alcohol concentration based on the type of alcohol (amount of alcohol) that the driver drank at the time of the accident, thereby suggesting alcohol decomposition time period depending on the gender and the weight of the driver.

In this case, the alcohol clearance per hour is set to be in the range of 0.008% to 0.03%, and it may be detected that alcohol clearance of 0.015% per hour is made on average. Accordingly, the decomposition time period may be calculated by dividing the blood alcohol concentration by the alcohol clearance per hour.

The decomposition time period calculator 310 may calculate a decomposition time period predicted as being required to reduce the blood alcohol concentration, which is measured by the alcohol measuring sensor 200, to the reference value or less, based on the alcohol clearance per hour determined depending on the gender and the weight of the driver by expanding the Widmark formula as described above.

In this case, the alcohol clearance per hour may be significantly varied depending on genders and weights. Accordingly, the heavier weight increases an amount of alcohol decomposed per hour to reduce the decomposition time period of the alcohol. In addition, a man decomposes a larger amount of alcohol than a woman to reduce the decomposition time period of the alcohol. In addition, the decomposition time period of the alcohol may be shortened or extended, depending on individual constitutions of drivers in even the same gender and the same weight.

Accordingly, the decomposition time period calculator 310 may calculate the decomposition time period predicted as being required to decompose alcohol, based on personal information, such as the gender and the weight of the driver, which is extracted by the IMS controller by authenticating the digital key 100, thereby obtaining the decomposition time period specified for a personal ability of the driver to decompose the alcohol.

To this end, the personal information, such as the height, the weight, the gender, and the sitting height, of the driver, which is extracted by the IMS controller by authenticating the digital key 100, may be stored in a memory and utilized as personal information for calculating the decomposition time period by the decomposition time period calculator 310.

In addition, the alcohol interlock controller 300 may identify a user of the digital key 100 by using a serial number of the digital key 100, which is set in the digital key 100.

The decomposition time period calculator 310 may specify a driver by using the serial number of the digital key 100, and may calculate the decomposition time period predicted as being required to decompose blood alcohol having a concentration received from the alcohol measuring sensor 200, based on the personal information of the driver, which is extracted by the IMS controller by authenticating the digital key 100.

The information on the decomposition time period calculated as described above may be transmitted to an ignition controller 320 to restrict the ignition by the driver using the relevant digital key 100 for the decomposition time period.

In addition, the alcohol interlock controller 300 may further include an alcohol clearance regulator 340 to increase or decrease the alcohol clearance per hour of the driver, by considering the decomposition time period, which is re-calculated based on the re-measured blood alcohol concentration and the time period elapsed to a current time point from the decomposition time period, which is previously calculated, when the same driver measures a blood alcohol concentration using the alcohol measuring sensor 200 before the decomposition time period calculated by the decomposition time period calculator 310 is elapsed.

An actual alcohol clearance of the driver, which is increased or decreased by the alcohol clearance regulator 340, may be reflected in re-calculating a decomposition time period required to decompose alcohol by the decomposition time period calculator 310, thereby enhancing the reliability for the calculated decomposition time period.

Accordingly, when the blood alcohol concentration first measured by the alcohol measuring sensor 200 exceeds a preset reference value, the decomposition time period calculator 310 may calculate a first decomposition time period (h1) predicted as being required to decompose the blood alcohol, and may restrict vehicle ignition by a user of the relevant digital key through the ignition controller 320 for the first decomposition time period (h1).

In this case, the decomposition time period calculator 310 may calculate the decomposition time period by determining an average value of the alcohol clearance based on the gender or the weight of the driver (for example, by determining the alcohol clearance per hour as 0.015%) or may calculate the decomposition time period based on the previous alcohol clearance of the driver, which is previously stored.

In addition, when the driver measures a blood alcohol concentration by using the same digital key, after a specific time period is elapsed within the first decomposition time period (h1), the decomposition time period calculator 310 may re-calculate a decomposition time period required to decompose remaining blood alcohol, based on the re-measured blood alcohol concentration.

In this case, when determining the alcohol clearance for the decomposition time period to be required to decompose the blood alcohol and corresponding to the re-measured blood alcohol concentration, the alcohol clearance regulator 340 may compare a remaining decomposition time period (h1−t1), which is obtained by subtracting the elapsed time period (t1) from the first decomposition time period (h1) predicted by the decomposition time period calculator 310 at the initial stage, with a second decomposition time period (h2) recalculated depending on a current blood alcohol concentration which is currently measured again. In this case, when the second decomposition time period (h2) is less than the remaining decomposition time period (h1−t1), the alcohol clearance regulator 340 may increase an alcohol clearance per hour to a specific ratio. When the second decomposition time period (h2) is greater than the remaining decomposition time period (h1−t1), the alcohol clearance regulator 340 decreases the alcohol clearance per hour to a specific ratio.

Accordingly, the alcohol clearance may be increased from an average value of 0.015 to a value of 0.020 or decreased from an average value of 0.015 to a value of 0.010, thereby calculating the decomposition time period of the blood alcohol to be suitable for the constitution of the driver.

In addition, the decomposition time period calculator 310 may determine the alcohol clearance, which is increased or decreased, as a current alcohol clearance of the driver, and may re-calculate and provide a decomposition time period by using the current alcohol clearance.

Accordingly, the ignition controller 320 may change a time period for restricting the ignition using the digital key, to the decomposition time period which is re-calculated based on the regulated alcohol clearance.

As described above, the blood alcohol concentration of the same driver is measured several times, and the decomposition time period is calculated based on the actual alcohol clearance of the driver, which is regulated depending on the measurement result. Accordingly, the personal difference of each driver may be considered to more exactly calculate the decomposition time period.

For an example, when calculating a decomposition time period as described above, a first test result of a blood alcohol concentration of the driver may show that the decomposition time period is calculated as 8 hours through the decomposition time period calculator 310 and a second test result of a blood alcohol concentration after one hour is elapsed may show that the decomposition time period is calculated as 6 hours. In this case, since it is determined that the decomposition time period of the blood alcohol of the driver is one hour earlier than one hour which is the time period actually elapsed, the alcohol clearance may be regulated and stored by reflecting the determination.

In this case, the decomposition time period calculator 310 may re-calculate a decomposition time period based on two alcohol test results by reflecting the regulated alcohol clearance. In addition, after storing the regulated alcohol clearance of the driver, the regulated alcohol clearance may be reflected in calculating the decomposition time period based on three alcohol test results.

In addition, the alcohol interlock controller 300 may provide an information message of "ignition is restricted because alcohol is currently sensed" through a cluster 400 installed in the vehicle, when the driver turns on the ignition of the vehicle before the decomposition time period is elapsed, and may provide, to the driver, information on the blood alcohol concentration of the driver, the decomposition time period, and the remaining decomposition time period of the driver.

In addition, the alcohol interlock controller 300 may allow the driver to simply recognize information on whether the decomposition time period is elapsed and the information on the remaining decomposition time period, even if the driver gets off the vehicle, by transmitting, to the smart phone of the driver, which is equipped with the digital key, the information on the blood alcohol concentration of the driver, the decomposition time period, and the remaining decomposition time period.

In addition, the alcohol interlock controller 300 may limit, to a specific number, the number of times of re-attempting measuring, in which an alcohol test is repeatedly performed to calculate the decomposition time period, as the alcohol level is measured by using the same digital key for the decomposition time period. Accordingly, the vehicle power may be prevented from being over-discharged due to repeated measurement performed by a driver in a drunken status in which the ignition of the vehicle is restricted. Although the retrial count for an alcohol test is set to five according to an exemplary embodiment of the present disclosure, the retrial count may be increased or decreased depending on the settings of the system.

In addition, the alcohol interlock controller 300 may further include a decomposition time period elapse determining device 330 to recognize whether the decomposition time period, which is calculated by the decomposition time period calculator 310, is elapsed through a timer disposed in a vehicle and to transmit a wording, or a voice for notifying that the digital key is able to be re-authenticated to turn on the ignition and a blood alcohol concentration is able to be re-measured, to the cluster or the smart phone of the driver, after the decomposition time period is elapsed.

To this end, the decomposition time period elapse determining device 330 may consecutively detect whether the decomposition time period is elapsed while restricting the ignition of the vehicle within the decomposition time period, because of storing the serial number and the decomposition time period of the digital key, even if the digital key is away from the vehicle for the decomposition time period.

Accordingly, the driver may recognize that the restriction of the ignition is released through a notification transmitted from the decomposition time period elapse determining device 330, even though the driver does not memorize or determine personally whether the decomposition time period is elapsed.

In this case, when the user intends to turn on the ignition of the vehicle by using another digital key instead of the digital key having the set decomposition time period, the procedure of measuring the blood alcohol concentration by the alcohol measuring sensor 200, the procedure of calculating, by the alcohol interlock controller 300, the decomposition time period based on the measured blood alcohol concentration, and the procedure of restricting the ignition may be identically performed.

In addition, the alcohol interlock controller 300 may further include the IMS controller 350 to automatically adjust a driver seat, depending on the personal information of the driver, such that the mouth of the driver is placed at an alcohol measuring position at which the driver comfortably exhales to the alcohol measuring sensor 200, when the driver gets in the vehicle to measure a blood alcohol concentration of the driver.

The IMS controller 350 may easily measure the blood alcohol concentration by automatically adjusting the driver seat to the alcohol measuring position, which is previously stored based on the personal information of the driver, which is extracted by authenticating the digital key 100, when the driver gets in the vehicle.

In general, the driver should incline the upper body forward to exhale to the alcohol measuring sensor 200 mounted at an upper portion of a steering wheel of the vehicle, a front portion of a cluster, or on an overhead console. Accordingly, the IMS controller 350 may automatically adjust the position of the driver seat, such that the driver is close to a position for exhaling to the alcohol measuring sensor 200, thereby allowing the driver to conveniently measure the blood alcohol concentration of the driver.

In addition, when the measurement result by the alcohol measuring sensor 200 does not exceed a reference value corresponding to drunk driving (measurement result pass), the IMS controller 350 may turn on the ignition of the vehicle and automatically adjust the driver seat to the preset optimal driving position such that the driver turns on the ignition of the vehicle and comfortably drives, thereby allowing the driver to conveniently operate the vehicle.

In addition, when the measurement result by the alcohol measuring sensor 200 exceeds the reference value corresponding to the drunk driving (the measurement result fail), the IMS controller 350 may automatically adjust the driver seat to a preset position allowing the driver to conveniently get in or get off the vehicle, since the ignition of the vehicle is restricted such that the operation of the vehicle is failed, thereby allowing the driver to conveniently get off the vehicle or wait for driving. Thereafter, when the re-measurement is required, the position of the driver seat may be adjusted to a position for conveniently measuring the blood alcohol concentration, through an input of an additional button operation.

The alcohol interlock controller 300 of the apparatus according to an exemplary embodiment of the present disclosure may be a processor (e.g., computer, microprocessor, CPU, ASIC, circuitry, logic circuits, etc.). The alcohol interlock controller 300 may be implemented by a non-transitory memory storing, e.g., a program(s), software instructions reproducing algorithms, etc., which, when executed, provides the functionalities of the decomposition time period calculator 310, the ignition controller 320, the decomposition time period elapse determining device 330, the alcohol clearance regulator 340, and the IMS controller 350. Herein, the memory and the processor may be implemented as separate semiconductor circuits. Alternatively, the memory and the processor may be implemented as a single integrated semiconductor circuit. The processor may embody one or more processor(s).

Hereinafter, an interlock control method linked to a digital key, according to another exemplary embodiment of the present disclosure will be described with reference to FIGS. 2 to 4.

Figure 2:
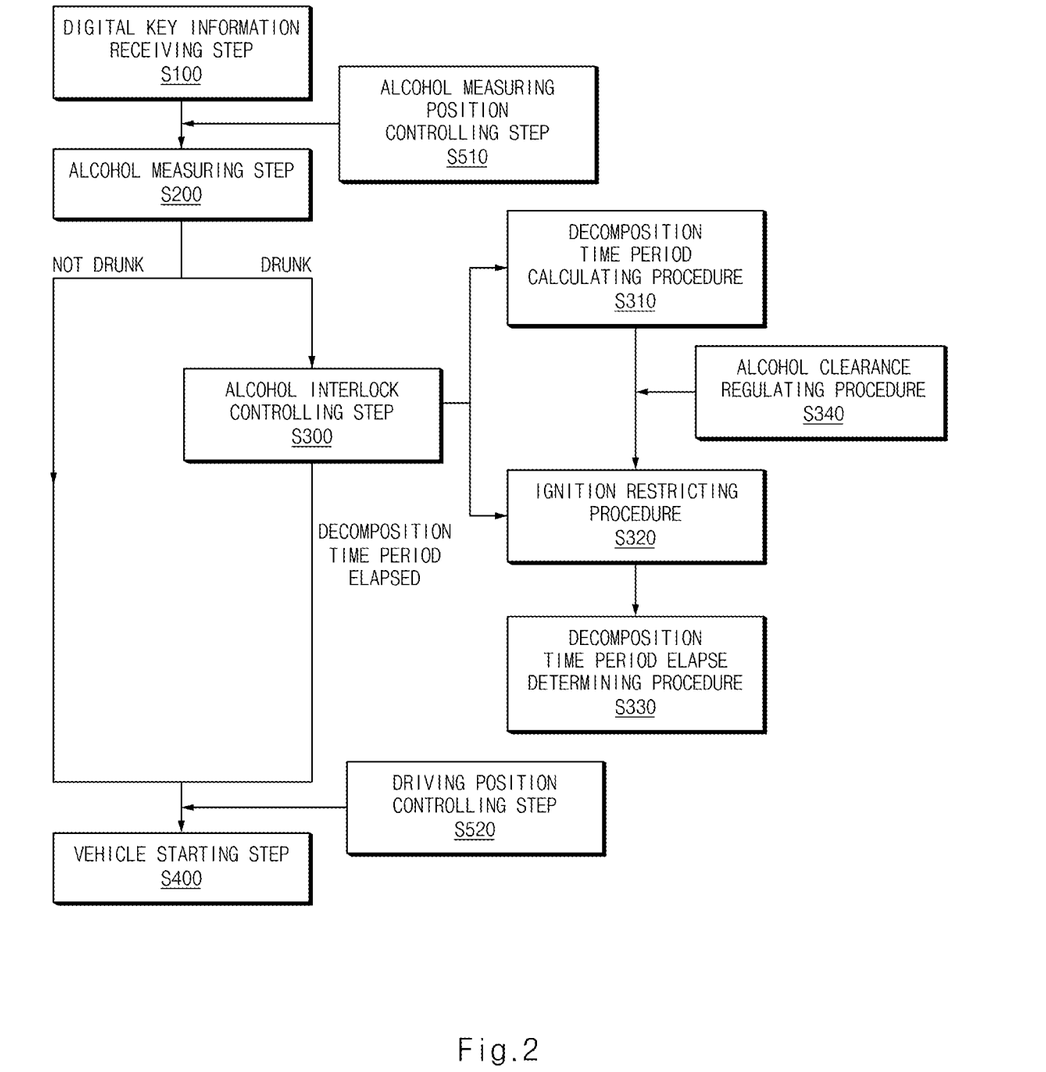
FIG. 2 is a process chart of an interlock control method linked to a digital key, according to an exemplary embodiment of the present disclosure.
Figure 3:
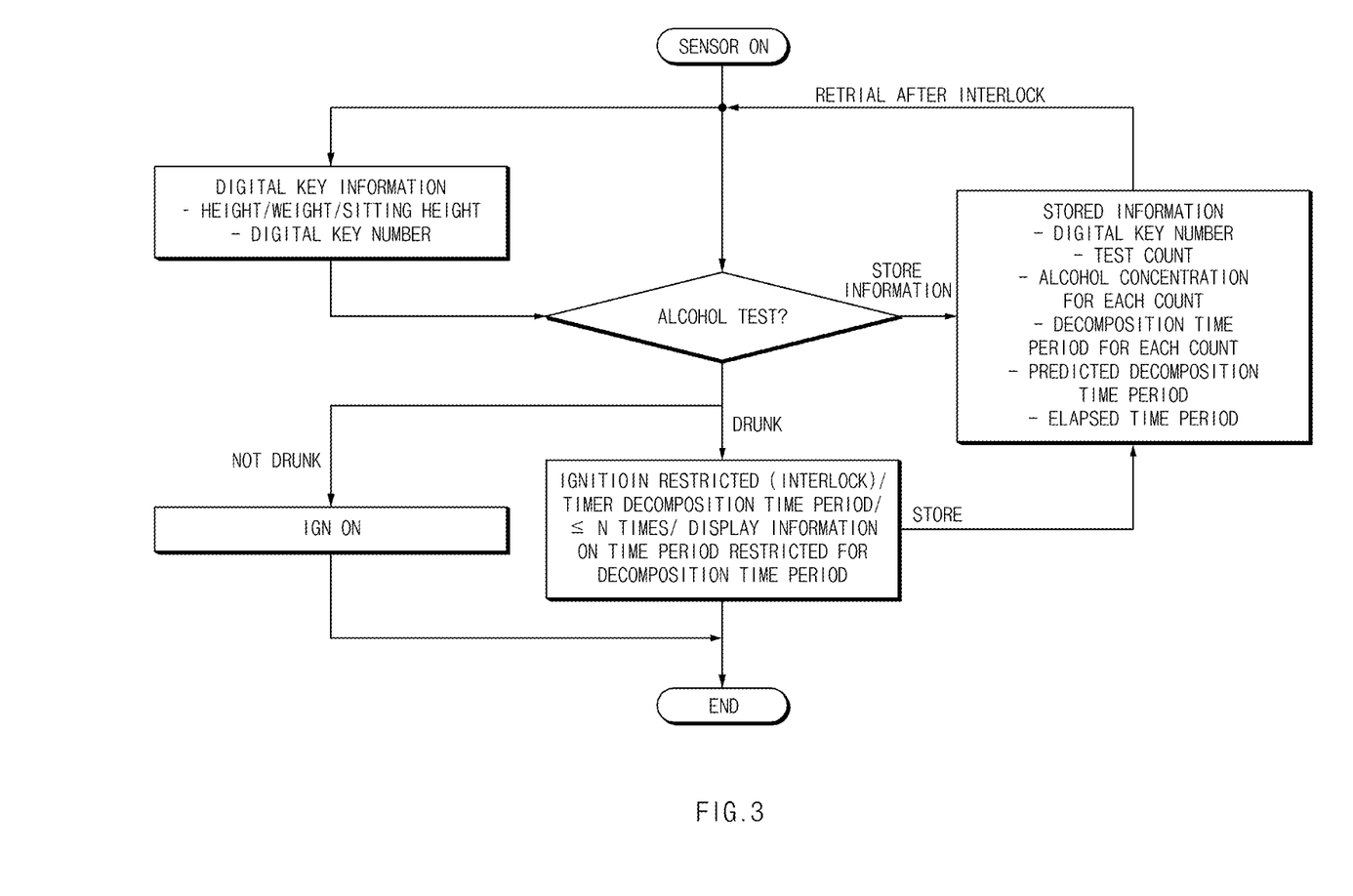
FIG. 3 is a flowchart illustrating that ignition is restricted for a decomposition time period predicted depending on an alcohol measurement result, according to an exemplary embodiment of the present disclosure.

Referring to FIGS. 2 and 3, according to another exemplary embodiment of the present disclosure, the interlock control method linked to the digital key may include a digital key information receiving step (S100) of receiving a serial number of a digital key through wireless communication between the digital key and a vehicle and of authenticating the use authority for the vehicle, an alcohol measuring step (S200) of receiving exhalation of a driver, which is input into the alcohol measuring sensor, to measure the blood alcohol concentration, an alcohol interlock controlling step (S300) of calculating a decomposition time period required to decompose blood alcohol of each driver, based on the personal information of the driver, which is extracted by the IMS controller by authenticating the digital key, when the blood alcohol concentration measured by the alcohol measuring sensor exceeds the preset reference value, and of restricting the ignition of the vehicle using the digital key for the decomposition time period, and a vehicle starting step (S400) of releasing the restriction of the ignition of the vehicle, when the blood alcohol concentration is less than the reference value or after the decomposition time period is elapsed.

In this case, in the digital key information receiving step (S100), the use authority for the vehicle may be authenticated through the device for the short-range wireless communication such as NFC, which is disposed in the vehicle, by using the digital key installed in the form of an application in the smart phone or the smart card.

Accordingly, the vehicle may specify a driver having the digital key, and the IMS controller installed in the vehicle may extract personal information, such as the height, the weight, the gender, or the sitting height of the authenticated driver, from information stored in the IMS, based on the information on the authentication of the digital key. An individual customized service, such as a service of adjusting the position of a driver seat fitted to the driver and the direction of a side mirror, may be provided by using the personal information of the driver.

In addition, in the alcohol measuring step (S200), the alcohol measuring sensor mounted at an upper portion of a steering wheel of the vehicle, a front portion of a cluster, or on an overhead console may receive exhalation from the driver and measure the blood alcohol concentration.

In this case, an alcohol measuring position controlling step (S510) may be further included to automatically adjust the driver seat such that the driver is positioned at an alcohol measuring position at which the driver conveniently exhales to the alcohol measuring sensor 200 based on the personal information of the driver getting in the vehicle before the alcohol measuring step (S200).

In addition, the alcohol interlock controlling step (S300) may include a decomposition time period calculating procedure (S310) of calculating a decomposition time period predicted as being required to decompose blood alcohol, based on the personal information of the driver, which is extracted by the IMS controller by authenticating the digital key, when the blood alcohol concentration of the driver, which is transmitted from the alcohol measuring sensor, exceeds a preset reference value, and an ignition restricting procedure (S320) of restricting the ignition using the digital key for the decomposition time period calculated by the decomposition time period calculating procedure (S310).

In this case, in the decomposition time period calculating procedure (S310), the decomposition time period predicted as being required to decompose the blood alcohol of the driver may be calculated based on the blood alcohol concentration of the driver and the personal information of the driver, and may be provided.

To this end, in the decomposition time period calculating procedure (S310), the decomposition time period may be calculated by dividing the blood alcohol concentration by the alcohol clearance per hour. In this case, the alcohol clearance per hour is set to 0.008% to 0.03%, and the alcohol clearance of 0.015% per hour is applied on average, such that the decomposition time period is calculated.

In this case, the alcohol clearance per hour may be significantly varied depending on genders and weights. In addition, the decomposition time period of the alcohol may be shortened or extended, depending on individual constitutions of drivers, even in the same gender and the same weight.

Accordingly, in the decomposition time period calculating procedure (S310), the decomposition time period predicted as being required to decompose alcohol is calculated based on personal information, such as the gender and the weight of the driver, which is extracted by the IMS controller by authenticating the digital key, thereby obtaining the decomposition time period specified for a personal ability of the driver to decompose the alcohol.

In addition, the alcohol interlock controlling step (S300) may further include an alcohol clearance regulating procedure (S340) of increasing or decreasing the alcohol clearance per hour of the driver, by considering a time period elapsed to a current time point and the decomposition time period, which is previously calculated, when the same driver measures the blood alcohol concentration using the alcohol measuring sensor 200 before the decomposition time period calculated by the decomposition time period calculator 310 is elapsed, and when re-calculating a decomposition time period, based on the re-measured blood alcohol concentration.

As described above, an actual alcohol clearance of the driver, which is increased or decreased in the alcohol clearance regulating procedure (S340), may be reflected in re-calculating the decomposition time period from the re-measurement result in the procedure of calculating the decomposition time period, thereby enhancing the reliability for the calculated decomposition time period.

In addition, when the driver measures a blood alcohol concentration by using the same digital key, after a specific time is elapsed within the first decomposition time period (h1) which is first calculated, the decomposition time period calculating step (S310) may include a procedure of re-calculating a second decomposition time period (h2) required to decompose blood alcohol remaining, based on the re-measured blood alcohol concentration.

Figure 4:
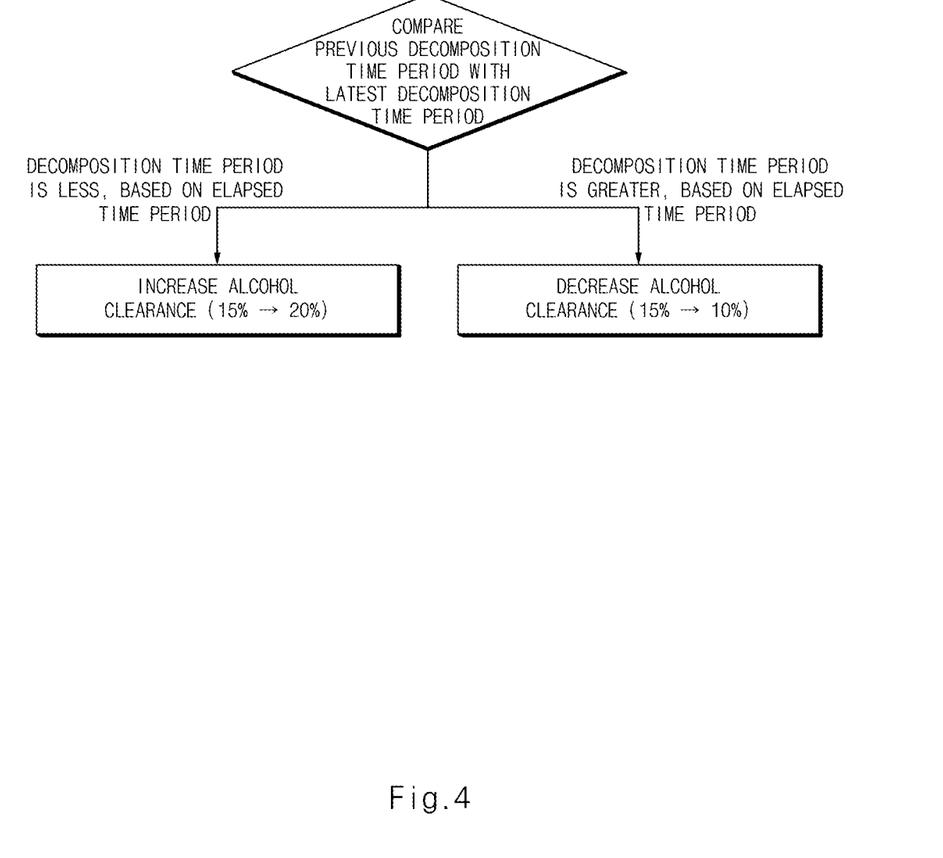
FIG. 4 is a flowchart illustrating that an alcohol clearance of a driver is regulated, according to an exemplary embodiment of the present disclosure.

In this case, the alcohol clearance regulating procedure (S340) may include a procedure of comparing a remaining decomposition time period (h1−t1), which is obtained by subtracting the elapsed time period (t1) from the first decomposition time period (h1) predicted in the decomposition time period calculating procedure at the initial stage, with the second decomposition time period (h2) re-calculated depending on the blood alcohol concentration which is currently re-measured, as illustrated in FIG. 4, when determining the alcohol clearance used for the decomposition time period required to decompose the blood alcohol and corresponding to the re-measured blood alcohol concentration. In this case, when the second decomposition time period (h2) is less than the remaining decomposition time period (h1−t1), the alcohol clearance regulator 340 may increase an alcohol clearance per hour to a specific ratio. When the second decomposition time period (h2) is greater than the remaining decomposition time period (h1−t1), the alcohol clearance regulator 340 decreases the alcohol clearance per hour to a specific ratio.

Accordingly, the decomposition time period may be calculated based on the actual alcohol clearance in which the personal difference of the driver is individually reflected.

Subsequently, the decomposition time period calculating step (S310) may include a procedure of determining an alcohol clearance, which is increased or decreased, as the current alcohol clearance of the driver, and re-calculating and providing the decomposition time period, in which the current alcohol clearance of each driver is reflected, by using the determined alcohol clearance.

Accordingly, the ignition restricting procedure (S320) may include changing a time period for restricting the ignition using the digital key, to the decomposition time period which is re-calculated based on the regulated alcohol clearance.

As described above, the blood alcohol concentration of the same driver is measured several times, and the decomposition time period is calculated based on the actual alcohol clearance of the driver, which is regulated depending on the measurement result. Accordingly, the personal difference of each driver may be considered such that the decomposition time period is more exactly calculated.

In addition, the alcohol interlock controlling step (S300) may include a procedure of providing an information message of "ignition is restricted because alcohol is currently sensed" through a cluster disposed in the vehicle, when the driver turns on the ignition of the vehicle before the decomposition time period is elapsed, and a procedure of providing, to the driver, information on the blood alcohol concentration of the driver, the decomposition time period, and the remaining decomposition time period to be recognized by the driver.

In addition, the alcohol interlock controlling step (S300) may include limiting, to a specific number, the number of times of re-attempting measuring, in which an alcohol test is repeatedly performed to calculate the decomposition time period, as the alcohol level is measured by using the same digital key for the decomposition time period.

In addition, the alcohol interlock controlling step (S300) may further include a decomposition time period elapse determining procedure (S330) of recognizing whether the decomposition time period is elapsed through a timer installed in a vehicle and transmitting a wording, or a voice for notifying that the digital key is able to be re-authenticated to turn on the ignition and a blood alcohol concentration is able to be re-measured, to the cluster or the smart phone of the driver, after the decomposition time period is elapsed.

To this end, the decomposition time period elapse determining procedure (S330) may include a procedure of consecutively detecting whether the decomposition time period is elapsed while restricting the ignition of the vehicle within the decomposition time period, because of storing information on the serial number and the decomposition time period of the digital key, even if the digital key is away from the vehicle for the decomposition time period.

Accordingly, the driver may recognize that the restriction of the ignition is released through a notification transmitted from the decomposition time period elapse determining procedure (S330), even though the driver does not memorize or does not determine personally whether the decomposition time period is elapsed.

In addition, when the measurement result by the alcohol measuring sensor does not exceed the reference value corresponding to drunk driving (measurement result pass) before the vehicle starting step (S400), the interlock control method may further include a driving position controlling step (S520) of automatically adjusting the driver seat to the preset optimal driving position, such that the driver turns on the ignition of the vehicle and comfortably drive.

In addition, when the measurement result by the alcohol measuring sensor exceeds the reference value corresponding to the drunk driving (the measurement result fail), the driver seat is automatically adjusted to a preset position allowing the driver to conveniently get in or get off the vehicle, since the ignition of the vehicle is restricted such that the operation of the vehicle is failed, thereby allowing the driver to conveniently get off the vehicle or wait for driving.

According to the present disclosure, the decomposition time period to restrict the ignition of the vehicle may be calculated based on the personal information of the driver, which is stored in the digital key, and the actual alcohol clearance of the driver, thereby restricting the ignition of the vehicle to prevent drunk driving and providing information on a time period allowing the driver to drive, such that the use convenience of the vehicle is improved.

In addition, according to the present disclosure, the driver seat may be automatically adjusted to a position for making the driver easy to exhale to measure an alcohol level, by using the personal information of the driver, which is extracted by the IMS controller by authenticating the digital key, when the driver gets in the vehicle.

Besides, a variety of effects directly or indirectly understood through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. An interlock control system linked to a digital key, comprising:
   the digital key authenticated in relation to use authority of a vehicle through wireless communication with the vehicle;
   an alcohol measuring sensor disposed in the vehicle and configured to measure a blood alcohol concentration of a driver by receiving exhalation of the driver; and
   an alcohol interlock controller configured to:
   when the blood alcohol concentration measured by the alcohol measuring sensor exceeds a reference value, specify the driver having the digital key,
   extract personal information for the specified driver from a memory of an integrated memory system (IMS) controller based on authenticating the digital key, calculate a first decomposition time period required to decompose blood alcohol of the driver based on the personal information of the driver, and restrict ignition of the vehicle using the digital key for the first decomposition time period, wherein the IMS controller is configured to automatically adjust a driver seat such that a mouth of the driver is placed at an alcohol measuring position when the driver gets in the vehicle to measure the blood alcohol concentration of the driver, wherein the alcohol measuring position is adjusted based on the personal information of the driver, and wherein the IMS controller turns on the ignition of the vehicle and automatically adjusts the driver seat to a preset driving position, such that the driver turns on the ignition of the vehicle and comfortably drives, when a measurement result by the alcohol measuring sensor does not exceed the reference value corresponding to drunk driving.

2. The interlock control system of claim 1, wherein the alcohol interlock controller includes: a decomposition time period calculator configured to calculate the first decomposition time period predicted as being required to decompose the blood alcohol, based on the personal information of the driver, when the blood alcohol concentration of the driver transmitted from the alcohol measuring sensor exceeds the reference value; and DB1/155768710.1 2an ignition controller configured to restrict the ignition using the digital key for the first decomposition time period calculated by the decomposition time period calculator.

3. The interlock control system of claim 2, wherein the decomposition time period calculator calculates the first decomposition time period by dividing the blood alcohol concentration by an alcohol clearance per hour.

4. The interlock control system of claim 2, wherein the alcohol interlock controller further includes: an alcohol clearance regulator configured to, when the driver re-measures a blood alcohol concentration through the alcohol measuring sensor before the first decomposition time period has elapsed, increase or decrease an alcohol clearance per hour of the driver, by considering a second decomposition time period, which is re-calculated based on the re-measured blood alcohol concentration, and a time period elapsed to a current time point from the first decomposition time period, which was previously calculated.

5. The interlock control system of claim 4, wherein the alcohol clearance regulator increases or decreases an alcohol clearance per hour individualized for a specific driver, depending on a result of comparison between a remaining decomposition time period (h1–t1) obtained by subtracting the elapsed time period (t1) from the first decomposition time period (h1) calculated by the decomposition time period calculator at an initial stage, and the second decomposition time period (h2) which is re-calculated depending on the re-measured blood alcohol concentration.

6. The interlock control system of claim 5, wherein the alcohol clearance regulator increases the alcohol clearance per hour to a specific ratio, when the second decomposition time period (h2) is less than the remaining decomposition time period (h1–t1).

7. The interlock control system of claim 5, wherein the alcohol clearance regulator decreases the alcohol clearance per hour to a specific ratio, when the second decomposition time period (h2) is greater than the remaining decomposition time period (h1–t1).

8. The interlock control system of claim 2, wherein the alcohol interlock controller further includes: a decomposition time period elapse determining device configured to: recognize whether the first decomposition time period has elapsed through a timer disposed in the vehicle, and after the first decomposition time period has elapsed, transmit a wording or a voice for notifying that the digital key is able to be re-authenticated to turn on the ignition and a blood alcohol concentration is able to be re-measured, to a cluster or a smart phone of the driver.

9. An interlock control method linked to a digital key, comprising:

a digital key information receiving step of receiving a serial number of the digital key through wireless communication between the digital key and a vehicle, and authenticating use authority for the vehicle;

an alcohol measuring step of receiving exhalation of a driver, which is input into an alcohol measuring sensor, to measure a blood alcohol concentration; and an alcohol interlock controlling step comprising:

specifying the driver having the digital key when the blood alcohol concentration measured by the alcohol measuring sensor exceeds a preset reference value, extracting personal information for the specified driver from a memory of an integrated memory system (IMS) controller based on authenticating the digital key, calculating a first decomposition time period required to decompose blood alcohol of each driver, based on the personal information of the driver, and restricting ignition of the vehicle using the digital key for the first decomposition time period, and wherein the method further comprises an alcohol measuring position controlling step of automatically adjusting a driver seat such that a mouth of the driver is positioned at an alcohol measuring position based on the personal information of the driver getting in the vehicle before the alcohol measuring step, wherein the alcohol measuring position is adjusted based on the personal information of the driver, and wherein the method further comprises a driving position controlling step of turning on the ignition of the vehicle and automatically adjusting the driver seat to a preset driving position, such that the driver turns on the ignition of the vehicle, when a measurement result by the alcohol measuring sensor does not exceed the reference value corresponding to drunk driving.

10. The interlock control method of claim 9, wherein the alcohol interlock controlling step includes: a decomposition time period calculating procedure of calculating the first decomposition time period predicted as being required to decompose the blood alcohol, based on the personal information of the driver, when the blood alcohol concentration of the driver transmitted from the alcohol measuring sensor exceeds the preset reference value; and an ignition restricting procedure of restricting the ignition using the digital key for the first decomposition time period calculated in the decomposition time period calculating procedure.

11. The interlock control method of claim 10, wherein the decomposition time period calculating procedure includes: calculating the first decomposition time period by dividing the blood alcohol concentration by an alcohol clearance per hour.

12. The interlock control method of claim 10, wherein the alcohol interlock controlling step further includes: an alcohol clearance regulating procedure of, when the driver re-measures a blood alcohol concentration using the alcohol measuring sensor before the first decomposition time period has elapsed, increasing or decreasing an alcohol clearance per hour of the driver, by considering a second decomposition time period re-calculated based on the re-measured blood alcohol concentration and a time period elapsed to a current time point from the first decomposition time period, which was previously calculated.

13. The interlock control method of claim 12, wherein the alcohol clearance regulating procedure includes: increasing or decreasing an alcohol clearance per hour individualized for a specific driver depending on a result of comparison between a remaining decomposition time period (h1−t1) obtained by subtracting the elapsed time period (t1) from the first decomposition time period (h1) calculated in the decomposition time period calculating procedure at an initial stage, and the second decomposition time period (h2) which is re-calculated depending on the re-measured blood alcohol concentration.

14. The interlock control method of claim 13, wherein the alcohol clearance regulating procedure includes: increasing the alcohol clearance per hour to a specific ratio, when the second decomposition time period (h2) is less than the remaining decomposition time period (h1−t1).

15. The interlock control method of claim 13, wherein the alcohol clearance regulating procedure includes: decreasing the alcohol clearance per hour to a specific ratio, when the second decomposition time period (h2) is greater than the remaining decomposition time period (h1−t1).

16. The interlock control method of claim 10, wherein the alcohol interlock controlling step further includes: a decomposition time period elapse determining procedure of recognizing whether the first decomposition time period has elapsed through a timer disposed in the vehicle and, after the first decomposition time period has elapsed, transmitting a wording or a voice for notifying that the digital key is able to be re-authenticated to turn on the ignition and the blood alcohol concentration is able to be re-measured, to a cluster or a smart phone of the driver.

* * * * *